(12) United States Patent
Powers et al.

(10) Patent No.: US 9,683,885 B2
(45) Date of Patent: Jun. 20, 2017

(54) DOME COATING FOR COUNTERMEASURE ANTI-ICING FUNCTIONALITY

(71) Applicant: BAE Systems Information And Electronic Systems Integration Inc., Nashua, NH (US)

(72) Inventors: Michael J. Powers, Amherst, NH (US); Donald K. Smith, Rye, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 14/942,199

(22) Filed: Nov. 16, 2015

(65) Prior Publication Data

US 2016/0223392 A1 Aug. 4, 2016

Related U.S. Application Data

(60) Provisional application No. 62/080,714, filed on Nov. 17, 2014.

(51) Int. Cl.
| | |
|---|---|
| G02B 1/12 | (2006.01) |
| G01J 1/02 | (2006.01) |
| B64D 7/00 | (2006.01) |
| B64D 15/00 | (2006.01) |
| F41H 5/26 | (2006.01) |
| G01J 5/04 | (2006.01) |
| G01J 1/04 | (2006.01) |
| G01J 5/08 | (2006.01) |

(52) U.S. Cl.
CPC .............. *G01J 1/0252* (2013.01); *B64D 7/00* (2013.01); *B64D 15/00* (2013.01); *F41H 5/263* (2013.01); *G01J 1/0271* (2013.01); *G01J 1/0407* (2013.01); *G01J 5/046* (2013.01); *G01J 5/0875* (2013.01)

(58) Field of Classification Search
CPC ........................... G02B 1/12; B29D 11/00865
See application file for complete search history.

(56) References Cited

U.S. PATENT DOCUMENTS

| | | | | |
|---|---|---|---|---|
| 8,803,088 | B1 * | 8/2014 | Ravichandran | B82Y 20/00 250/330 |
| 2002/0117621 | A1 * | 8/2002 | Nakamura | H04N 5/33 250/330 |
| 2004/0211892 | A1 * | 10/2004 | Stallard | G02B 7/028 250/239 |
| 2008/0173816 | A1 * | 7/2008 | Everett | B60R 11/04 250/332 |
| 2011/0030728 | A1 * | 2/2011 | Semmer | B08B 3/02 134/18 |
| 2012/0193341 | A1 * | 8/2012 | Reul | H05B 3/84 219/203 |

* cited by examiner

*Primary Examiner* — David Porta
*Assistant Examiner* — Faye Boosalis
(74) *Attorney, Agent, or Firm* — Sand & Sebolt, LPA; Scott J. Asmus

(57) ABSTRACT

An infrared countermeasure system comprises a transparent infrared camera dome with an anti-icing surface coating.

15 Claims, 3 Drawing Sheets

DOME COATING FOR COUNTERMEASURE ANTI-ICING FUNCTIONALITY

CROSS-REFERENCE TO RELATED APPLICATIONS

This application claims the benefit of U.S. Provisional Patent Application Ser. No. 62/080,714, filed Nov. 17, 2014, the entire specification of which is incorporated herein by reference.

BACKGROUND

1. Technical Field

Generally the technical field relates to electronic countermeasures and more particularly to infrared countermeasure (IRCM) systems. More particularly, the technical field relates to dome coatings used in IRCM systems.

2. Background Information

An infrared countermeasure (IRCM) system is designed to protect aircraft from infrared homing ("heat seeking") missiles by confusing the missiles' infrared guidance system so that they will miss their target. Airborne infrared countermeasure (IRCM) systems are required to defeat missile threats over a full spherical coverage of 360 degrees. To defeat advanced missile threats, high powered radar systems mounted on gimbals are firstly directed to detect the missile threats. Generally, detecting and responding to missile threats are the crucial steps to defeat the missile threats. Furthermore, since the missile threats can come from any direction, gimbals are required to quickly and accurately to respond and change their direction to where the threats are located. For these gimbals to work properly and accurately, they are needed to be protected in a sealed housing or housings, which enable a mounted infrared sensor or camera to look through domes that operate with maximum optical transmission and quality in the infrared spectrum. Thus, the window of the dome should always be clear to see through even in harsh environments. Specifically, the surface of the dome should remain clear of moisture and ice, and also should be resistant to damage from foreign objects such as sand and any type of airborne particles. Typically, materials used for infrared operation have poor thermal conductivity so that ice prevention by a traditional heating method is not the best solution to achieve a clear dome surface. Applications of direct heating with a resistive grid, convective heating with warm air inside the dome, and direct conductive heating by heating the base of the dome may work for typical visible commercial type applications. However, these types of direct heating methods sometimes interfere with precision infrared countermeasure performance. In addition, the existing heating methods are very costly, add weight to the aircraft, and consume significant energy from aircraft due to heating. However, there are no other applications that utilize extended domes with coatings that are designed to provide IR performance, durability, and anti-icing capability. Thus, there is a need for a durable, passive, and cost effective anti-icing dome coating method for infrared countermeasure (IRCM) systems.

SUMMARY

In one aspect, an infrared countermeasure system may comprise a transparent infrared camera dome having an outer surface; and an anti-icing surface coating on the outer surface comprising carbon nanocomposites.

BRIEF DESCRIPTION OF THE DRAWINGS

A sample embodiment is set forth in the following description and is shown in the drawings and is particularly and distinctly pointed out and set forth in the appended claims.

Similar numbers refer to similar parts throughout the drawings.

DETAILED DESCRIPTION OF THE EMBODIMENT

Figure 1:
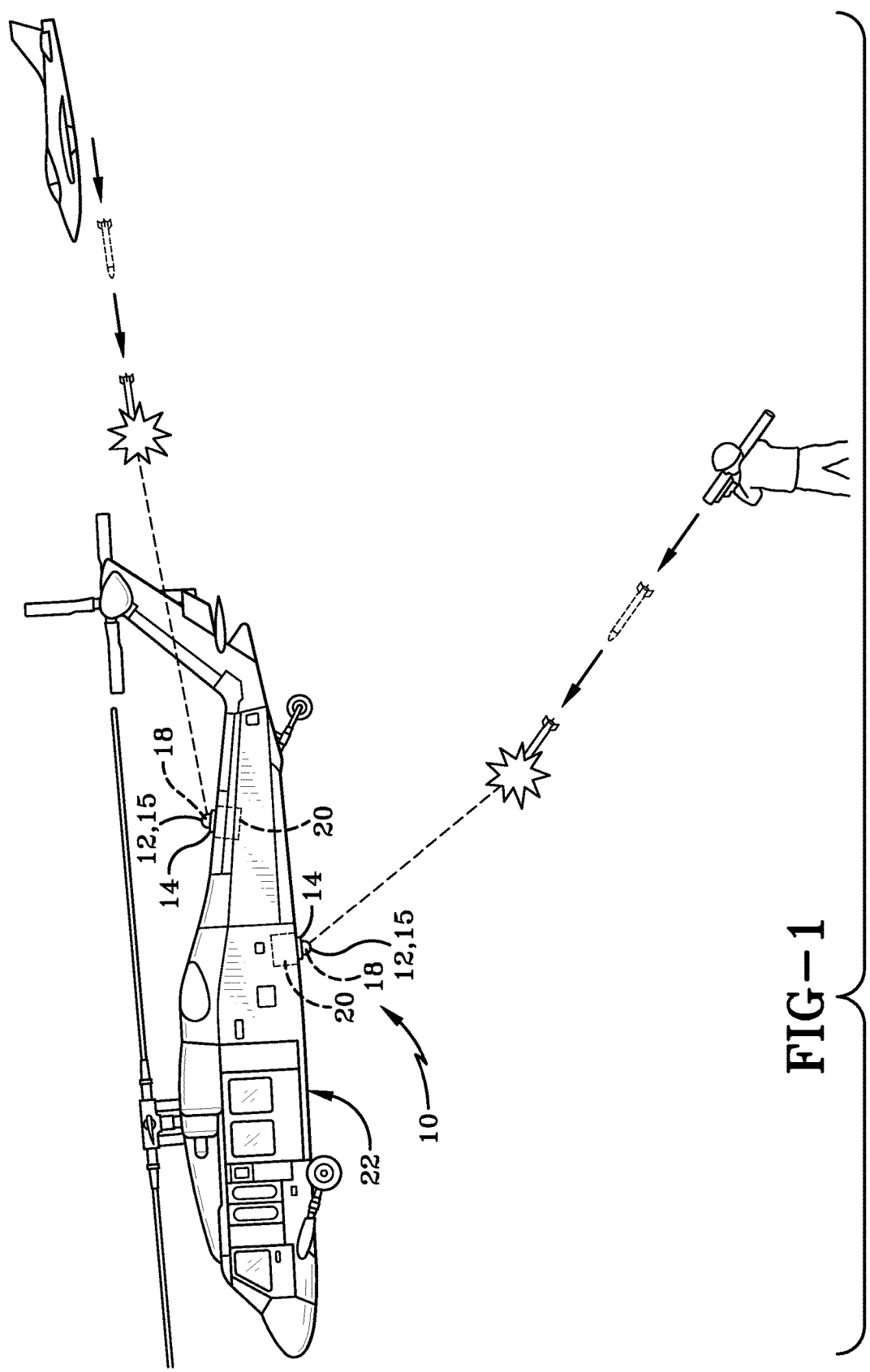
FIG. 1 is a schematic view showing an anti-icing dome assembly in use with a defensive infrared countermeasure system.

The current application is related with a countermeasure system which comprises an infrared dome assembly which is mounted on an aircraft. As depicted in FIG. 1, the infrared dome assembly 10 is mounted on aircraft 22. Aircraft 22 is depicted as a helicopter but may be any other form of flying device as one having ordinary skill in the art would understand. By way of brief introduction, an infrared (IR) countermeasure system is designed to protect aircraft from infrared homing ("heat seeking") missiles by confusing the missiles' infrared guidance system so that they will miss their target (Electronic countermeasure). Infrared dome assembly 10 is composed of IR transparent dome 12, a dome mounting flange, bezel or base 14, a coupling member 16 attaching dome 12 to base 14 and anti-icing coating 15.

As shown in FIG. 1, dome assembly 10 may be used with an electro-optical (EO) system 18 and a modular unit or module 20. Dome assembly 10 may be used to house EO 18 and gimbals which are used to control the orientation of EO system 18. Modular unit 20 may be mounted flushly with the outer shell or fuselage of flying device 22 such that base 14 and dome 12 extend slightly outward from fuselage of flying device 22. Modular unit 20 is configured to carry electro-optical system 18. The electro-optical system 18 may be a camera system or a laser system or any other electro-optical system as one having ordinary skill in the art would understand. Examples of domes, coupling members, EO systems, gimbals, modular units and other aspects of countermeasure systems are described in greater detail in the co-owned PCT patent application, and having at least one common inventor, entitled "Hyper Hemisphere Unitary Dome For A Defensive Infrared Countermeasure System" which is filed on the same date as the present application PCT/US 15/60898, and is entirely incorporated herein by reference as if fully rewritten.

Figure 2:
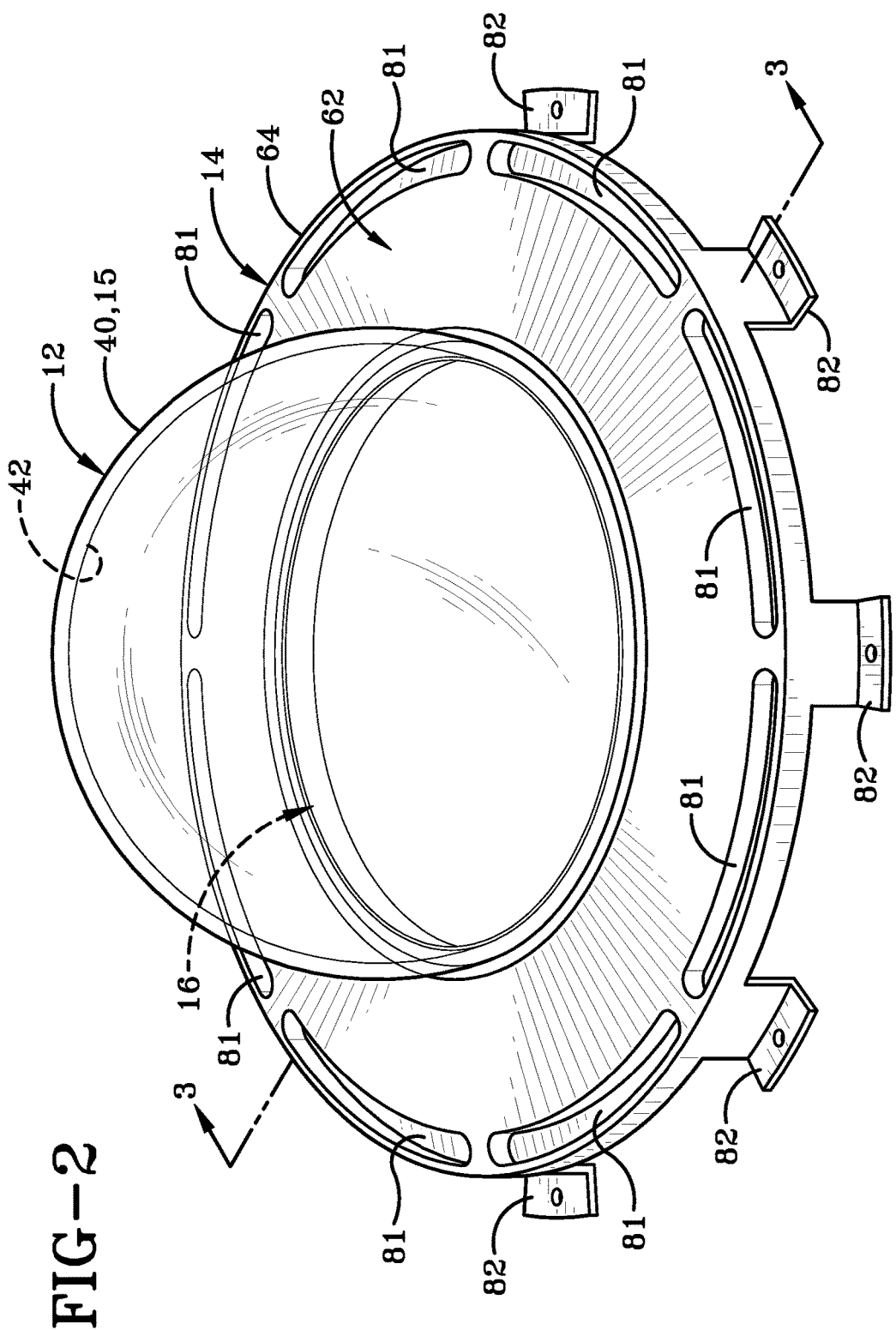
FIG. 2 is a perspective view of embodiment of the dome assembly.

As depicted in FIG. 2, base 14 includes a generally annular member or wall 62 having an outer edge 64 and flexure tabs 82 mounted on and extending outwardly from annular wall 62. Flexure tabs 82 are designed to flex and allow the bezel or base 14 to protect dome 12 from stresses due to thermal expansion in rapidly changing temperature environments such as during flight. Base 14 defines a plurality of arcuate cutouts or channels 81 extending circumferentially about base 14. Channels 81 also assist with the protection from stresses observed during changes in pressure or temperature during flight. Base 14 is primarily fabricated from a material different from that of dome 12.

Base 14 may, for instance, be fabricated from titanium or another suitable metal. Dome 12 and base 14 have respective coefficients of thermal expansion which may approximate one another. For example, dome 12 may be fabricated from sapphire material and base 14 may be fabricated from titanium. However, each material may have a similar coefficient of thermal expansion such that when the base is coupled to the dome via coupling member 16, the base and dome expand and contract relative to one another at a similar rate, which may produce a net zero effect so no gaps are formed where the two pieces are connected.

Figure 3:
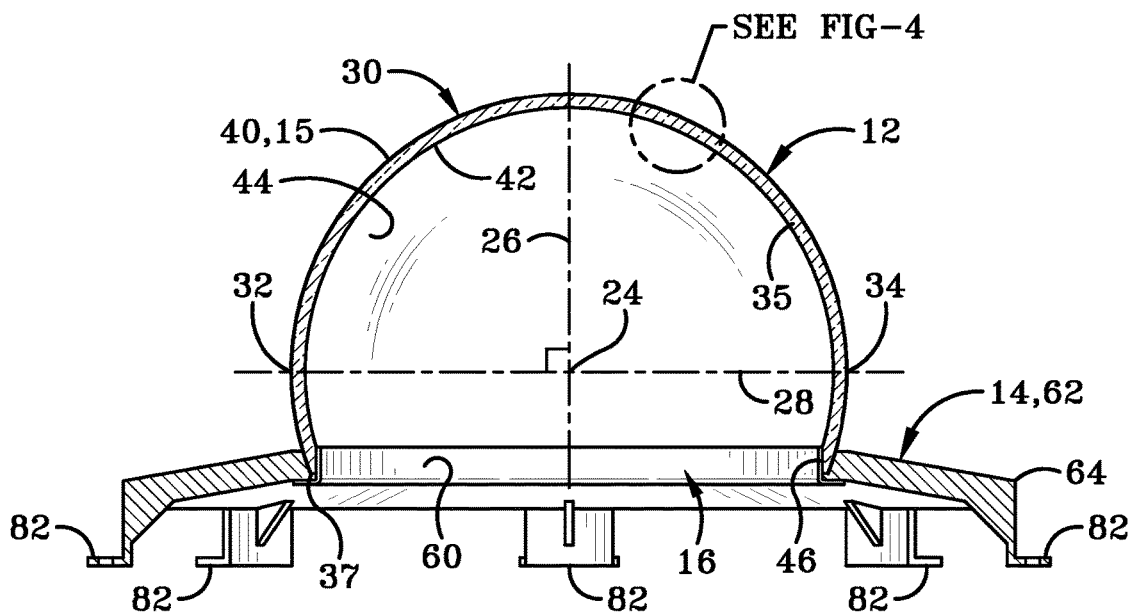
FIG. 3 is a longitudinal cross-section view of the dome assembly taken on line 3-3 of FIG. 2.

As depicted in FIG. 2 and FIG. 3, infrared camera dome 12 may have a center 24 at which an imaginary vertical axis 26 perpendicularly intersects an imaginary transverse axis 28. Dome 12 includes a dome wall 35 having a circular terminal edge 37. Dome 12/wall 35 may have a convexly curved outer surface 40 and a concavely curved inner surface 42 which parallels surface 40 so that wall 35 has an essentially constant thickness except adjacent edge 37, where the thickness may be less than that of the remainder of wall 35. Dome 12 may be a single piece of material with no seams that would interfere with countermeasure performance, e.g., the ability of IR camera or EO system 18 to see clearly through dome 12/wall 35. Inner surface 40 defines an interior chamber 44 having an entrance opening 60 defined by edge 37. Edge 37 and opening 60 may be circular. Outer surface 40 faces radially outward away from center 24 and interior chamber 44 while surface 42 faces radially inward towards center 24 and chamber 44. Dome 12 may include a first hemispherical region 30 which may be in the shape of a right angle hemisphere spanning 180 degrees above imaginary transverse axis 28 from first and second equator points 32 and 34 on outer surface 40, with second point 34 being diametrically opposite the first 32.

Figure 4:
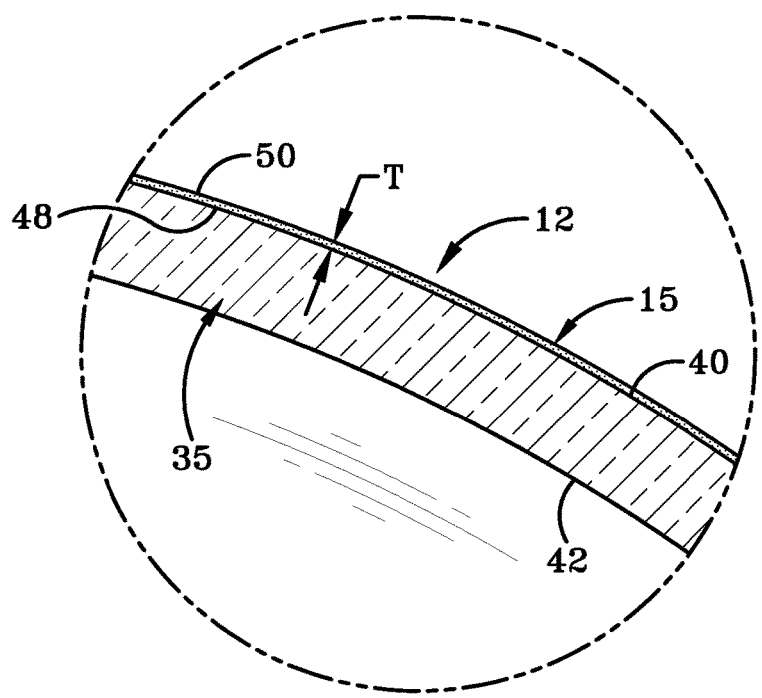
FIG. 4 is an enlarged view of the encircled portion of FIG. 3.

With reference to FIGS. 3 and 4, anti-icing coating 15 may extend along and be secured to outer surface 40. Coating 15 may have a concavely curved inner surface 48 which may be secured to outer surface 40 and have a radius of curvature which is essentially the same as that of outer surface 40. Coating 15 may have a convexly curved outer surface 50 which may parallel inner surface 48. Inner and outer surfaces 48 and 50 may define therebetween a normal thickness T of coating 15, which may be in a range of 50 to 1000 nm. Coating 15 may be applied on the entire outer surface of dome 12 or only on some outer portions of dome 12. Coating 15 may be a durable anti-reflection (AR) coating material which prevents ice from forming on outer surface 40 of dome 12.

Dome 12/wall 35 and coating may be at least hemispherical or be hyper-hemispherical. Thus, dome 12 and coating 15 may have a look angle or optical field of view which may be at least 180 degrees or greater than 180 degrees. Thus, camera/EO system 18 may look through dome 12 and coating 15 over a look angle or optical field of view which may be at least 180 degrees or greater than 180 degrees. EO system 18 may be carried by a gimbal centered at the center of dome 12 so that EO system may rotate on the gimbal and can shoot a laser beam or otherwise look through dome 12 across a look angle which may be equal to or greater than 180 degrees when viewed in cross-section (see FIG. 3). EO system 18 may also rotate with the gimbal a full 360 degrees about vertical axis 26.

With reference to FIG. 2, coupling member 16 may be an annular member which extends along edge 37 of dome 12/wall 35 and an inner perimeter of annular wall 62 of base 14. Member 16 may extend from wall 35 along edge 37 to wall 62 along its inner perimeter. A portion of member 16 may extend within chamber 44 along entrance opening 60.

Dome 12/wall 35 may be made from transparent materials that meet infrared performance requirements and are able to withstand harsh environmental conditions such as may be encountered during aircraft flight. Dome 12 may be fabricated from sapphire, aluminum oxynitride, magnesium aluminate, or any other suitable transparent material. Aluminum oxynitride is a transparent advanced ceramic that is polycrystalline (made from powder) with a cubic spinel structure, and is sold by Surmet Corporation of Burlington, Massachusetts under the trademark ALON®.

Coating 15 may be SP³EC™ (Surface Performance Enhancement Coating) manufactured by United Protective Technologies. SP³EC™ is a coating material which is made of or comprising carbon nanocomposites. Particularly, SP³EC™ has exotic mechanical, electrical, and optical properties including: 1) maximum surface hardness; 2) extremely low coefficient of friction (CoF); 3) exceptional wear properties; 4) excellent dielectric properties; 5) high thermal conductivity; and 6) optically transparent in infrared (IR) wavelengths. More particularly, SP³EC™ can be readily applied to flat, concave, or convex surfaces, and low processing temperature ensures that the application of SP³EC™ will not affect part tolerances. Furthermore, SP³EC™ can be applied on various optical substrates such as germanium, silicon, fused silica, optical polymers.

Particularly, SP³EC™ has the structure of matrix of nanocrystalline diamond (ta-C) and amorphous carbon (a-C:H) bonds with grain sizes ranging from 10 to 100 nm. The coating may be deposited at near ambient temperatures (20-25° Celsius) with a Plasma-Enhanced Chemical Vapor Deposition (PECVD) method so that the process does not disrupt properties of dome 12.

Hydrocarbon precursor gases may be mixed with other dopant carrier gases to allow the coating to be doped with various elements to tune the thin film properties such as refractive index and resistivity. Alternately, a Physical Vapor Deposition (PVD) process can be used with plasma assisted precursor gases. However, to achieve uniform coating on dome 12, PVD processes are difficult for this particular application due to the nature of process and the shape of the substrate.

In one embodiment, the coating of SP³EC™ typically shows transmission loss of less than 1 to 2 percent over the mid-infrared wavelength ranges of 2 to 5 μm. Furthermore, the coating also shows transmission loss of less than 10 to 25 percent over visible wavelength ranges of 0.4 to 0.7 μm.

In one embodiment, SP³EC™ coating shows sufficient hydrophobic properties to minimize and limit ice and water formation on dome 12. More particularly, SP³EC™ coating produces ultra-low surface energy, forcing water and oil from the surface. Typical contact angle hysteresis measurements are 20 to 21 degrees on the surface of uncoated ALON® samples. However, the measurement of the contact angle on the surface of ALON® coated with SP³EC™ decreases to 10 to 12 degrees. Furthermore, the carbon coating not only prevents the surface from being wetted, but may also prevent the possibility of corrosion and biofouling component life by 250 percent. More particularly, the carbon coating can also be used to increase the mechanical properties while creating little optical degradation. This anti-reflective carbon nanocomposite coating enhances the transmission through the substrate/dome and may also increase 2 to 5 times durability over existing coatings.

Those skilled in the art will appreciate that a passive solution on a hyper-hemispherical dome prevents ice buildup, and will maintain full IR countermeasure performance. Existing solutions for common windows are not transferrable to dome shape, requires excessive power, and are not durable or interfere with IR performance. In contrast, dome 12 with coating 15 may meet all requirements for the countermeasure applications.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration set out herein are an example not limited to the exact details shown or described.

The invention claimed is:

1. An infrared countermeasure system comprising:
   a transparent infrared camera dome having an outer surface; and
   an anti-icing surface coating on the outer surface comprising carbon nanocomposites, wherein the dome is fabricated from a single piece of material with no seams, and wherein the surface coating has a structure of a matrix of nanocrystalline diamond and amorphous carbon bonds comprising grain sizes from 10 to 100 nanometers.

2. The system of claim 1, wherein the dome is fabricated from one of aluminum oxynitride, magnesium aluminate, and sapphire.

3. The system of claim 1, wherein the surface coating has a thickness of 50 to 1000 nanometers.

4. The system of claim 1, wherein the surface coating has a transmission loss of less than 2 percent over mid-infrared wavelength ranges of 2 to 5 micrometers.

5. The system of claim 1, wherein the surface coating has a transmission loss of less than 25 percent over visible wavelength ranges of 0.4 to 0.7 micrometer.

6. The system of claim 1, wherein the surface coating has a contact angle hysteresis of 10 to 12 degrees.

7. The system of claim 1, wherein the outer surface is partially covered by the surface coating.

8. The system of claim 1, wherein the outer surface is fully covered by the surface coating.

9. The system of claim 1, wherein the dome has an optical field of view of 180 degrees.

10. The system of claim 1, wherein the dome has an optical field of view of over 180 degrees.

11. The system of claim 1, wherein the surface coating has ultra-low surface energy.

12. The system of claim 1, wherein the surface coating has hydrophobic properties which minimize and limit ice and water formation on the dome.

13. The system of claim 1, wherein the surface coating has a transmission loss of less than 1 percent over mid-infrared wavelength ranges of 2 to 5 micrometers.

14. The system of claim 1, wherein the surface coating has a transmission loss of less than 10 percent over visible wavelength ranges of 0.4 to 0.7 micrometer.

15. An infrared countermeasure system comprising:
    a transparent infrared camera dome having an outer surface; and
    an anti-icing surface coating on at least some portion of the outer surface, said surface coating comprising carbon nanocomposites, wherein the dome is fabricated from a single piece of material with substantially no seam and the surface coating has a transmission loss of less than 2 percent over mid-infrared wavelength ranges of 2 to 5 micrometers.

* * * * *